(12) United States Patent
Astigarraga et al.

(10) Patent No.: US 8,311,408 B2
(45) Date of Patent: Nov. 13, 2012

(54) METHOD AND APPARATUS FOR END OF LIFE OF SMALL FORM-FACTOR PLUGGABLE (SFP)

(75) Inventors: Tara Astigarraga, Vail, AZ (US); David Franklin DeHaan, Tucson, AZ (US); Louie Arthur Dickens, Tucson, AZ (US); Omolaoye Olatunde-Bello, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 923 days.

(21) Appl. No.: 12/174,012

(22) Filed: Jul. 16, 2008

(65) Prior Publication Data

US 2010/0014853 A1    Jan. 21, 2010

(51) Int. Cl.
*H04B 10/08* (2006.01)
(52) U.S. Cl. .............. 398/25; 398/9; 398/17; 398/22; 398/23; 398/135; 398/137
(58) Field of Classification Search ........... 398/9, 17, 398/22, 23, 25, 135–137
See application file for complete search history.

(56) References Cited

U.S. PATENT DOCUMENTS

| | | | |
|---|---|---|---|
| 5,412,809 A | 5/1995 | Tam et al. | |
| 5,812,572 A * | 9/1998 | King et al. | 372/38.04 |
| 6,246,510 B1 * | 6/2001 | BuAbbud et al. | 359/337 |
| 6,433,512 B1 | 8/2002 | Birkler et al. | |
| 6,538,413 B1 | 3/2003 | Beard et al. | |
| 7,002,569 B1 | 2/2006 | Gettemy et al. | |
| 7,529,094 B2 * | 5/2009 | Miller | 361/715 |
| 2001/0049618 A1 * | 12/2001 | Patzel et al. | 705/8 |
| 2005/0031357 A1 * | 2/2005 | Soto et al. | 398/198 |
| 2005/0074990 A1 * | 4/2005 | Shearman et al. | 439/65 |
| 2005/0105910 A1 * | 5/2005 | Light | 398/137 |
| 2006/0159461 A1 * | 7/2006 | Nelson et al. | 398/135 |
| 2006/0245306 A1 | 11/2006 | De Boer et al. | |
| 2007/0196104 A1 * | 8/2007 | Nelson et al. | 398/25 |

FOREIGN PATENT DOCUMENTS

JP    2004-319657    * 11/2004

* cited by examiner

*Primary Examiner* — Li Liu
(74) *Attorney, Agent, or Firm* — Hamilton & Terrile, LLP; Gary W. Hamilton (57) ABSTRACT

A method, system and computer-usable medium are disclosed for visually indicating the remaining life of a small form factor pluggable (SFP) optical transceiver module. The total number of optical light pulse signals processed by an SFP are compared to a predetermined lifecycle number of signals that can be processed before the SFP enters a failed operating state. The remaining life of the SFP is calculated. A first display visually indicates that the total number of processed signals has not exceeded the lifecycle number of signals. A second display located on the SFP enclosure visually indicates the SFP has reached the end of its lifecycle.

17 Claims, 4 Drawing Sheets

METHOD AND APPARATUS FOR END OF LIFE OF SMALL FORM-FACTOR PLUGGABLE (SFP)

BACKGROUND OF THE INVENTION

1. Field of the Invention

Embodiments of the disclosure relate in general to the field of computers and related technologies. In particular, it relates to visually indicating the remaining life of a small form factor pluggable (SFP) optical transceiver module.

2. Description of the Related Art

An optical transceiver is a transmitter and receiver combined in a single module to provide optical-to-electric and electric-to-optical conversion in an optical communication system. Various optical transceivers conform to the Small Form-Factor Pluggable (SFP) MSA (Multi Source Agreement), which is a specification for a common interface for optical modular transceivers. In general, SFP transceivers are designed to support Synchronous Optical Networking (SONET), Fibre Channel, and other communications standards. As typically implemented, an SFP provides an interface from the mother board of a network device, such as a switch or a router, to a fiber optic networking cable.

Current SFP transceivers support data speeds in excess of five gigabits per second (5 Gbs) and future versions will likely support even higher data rates. Because SFP modules are designed to be hot-swappable, they can be easily interchanged and electro-optical or fiber optic networks can be conveniently upgraded and maintained. For example, rather than replacing an entire circuit board containing several optical transceivers, a single module can be removed and replaced for repair or upgrading. Accordingly, substantial costs savings can be realized.

Current SFP modules are capable of processing billions of optical signal pulses before they eventually fail. However, the number of pulses that can be processed by each type of SFP is finite, and furthermore, is generally known through a combination of design specifications and empirical analysis. However, there is currently no way of warning the user when that number is being approached or has been exceeded. As a result, users are not able to reliably determine when an SFPs is likely to fail. In view of the foregoing, there is a need to visually indicate when an SFP is nearing the end of its lifecycle so it can be replaced before it fails.

BRIEF SUMMARY OF THE INVENTION

The present invention includes, but is not limited to, a method, system and computer-usable medium for visually indicating the remaining life of a small form factor pluggable (SFP) optical transceiver module. In various embodiments, an SFP comprises logic operable to monitor the total number of optical light pulse signals processed by the SFP during its operational life. The total number of processed signals is then compared to a predetermined lifecycle number of signals that can be processed by the SFP before it enters a failed operating state. In one embodiment, the SFP comprises logic that calculates the remaining life of the SFP based on the comparison between the total number of signals processed and the lifecycle number of signals.

In various embodiments, a light emitting diode (LED) located on the SFP enclosure is illuminated to visually indicate that the total number of processed signals has exceeded the lifecycle number of signals. In one embodiment, a color attribute (e.g., the color red) of the LED indicates that the SFP has reached the end of its lifecycle. In another embodiment, a message (e.g., "ERROR", "FAILED", etc.) is displayed on an alphanumeric character display located on the SFP enclosure to indicate that the SFP has reached the end of its lifecycle.

In various embodiments, the SFP comprises logic that compares the total number of processed signals to the lifecycle number of signals and then performs calculations to determine the remaining life of the SFP. In one embodiment, an LED located on the SFP enclosure is illuminated to visually indicate that the SFP has not reached the end of its lifecycle. In another embodiment, a color attribute (e.g., the color green) of the LED indicates that the SFP has not reached the end of its lifecycle. In yet another embodiment the remaining life of an SFP is visually indicated by displaying a percentage (e.g., "47%", "22%", etc.) on an alphanumeric character display 308 located on the SFP enclosure. In this embodiment, the displayed percentage quantitatively indicates the remaining life of the SFP. In still another embodiment, the displayed percentage quantitatively indicates the total number of optical light pulse signals processed by the SFP relative to its lifecycle number of signals. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

A method, system and computer-usable medium are disclosed for visually indicating the remaining life of a small form factor pluggable (SFP) optical transceiver module. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device or a magnetic storage device. In the context of this document, a computer-usable or computer-readable medium may be any medium that can contain, or store the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
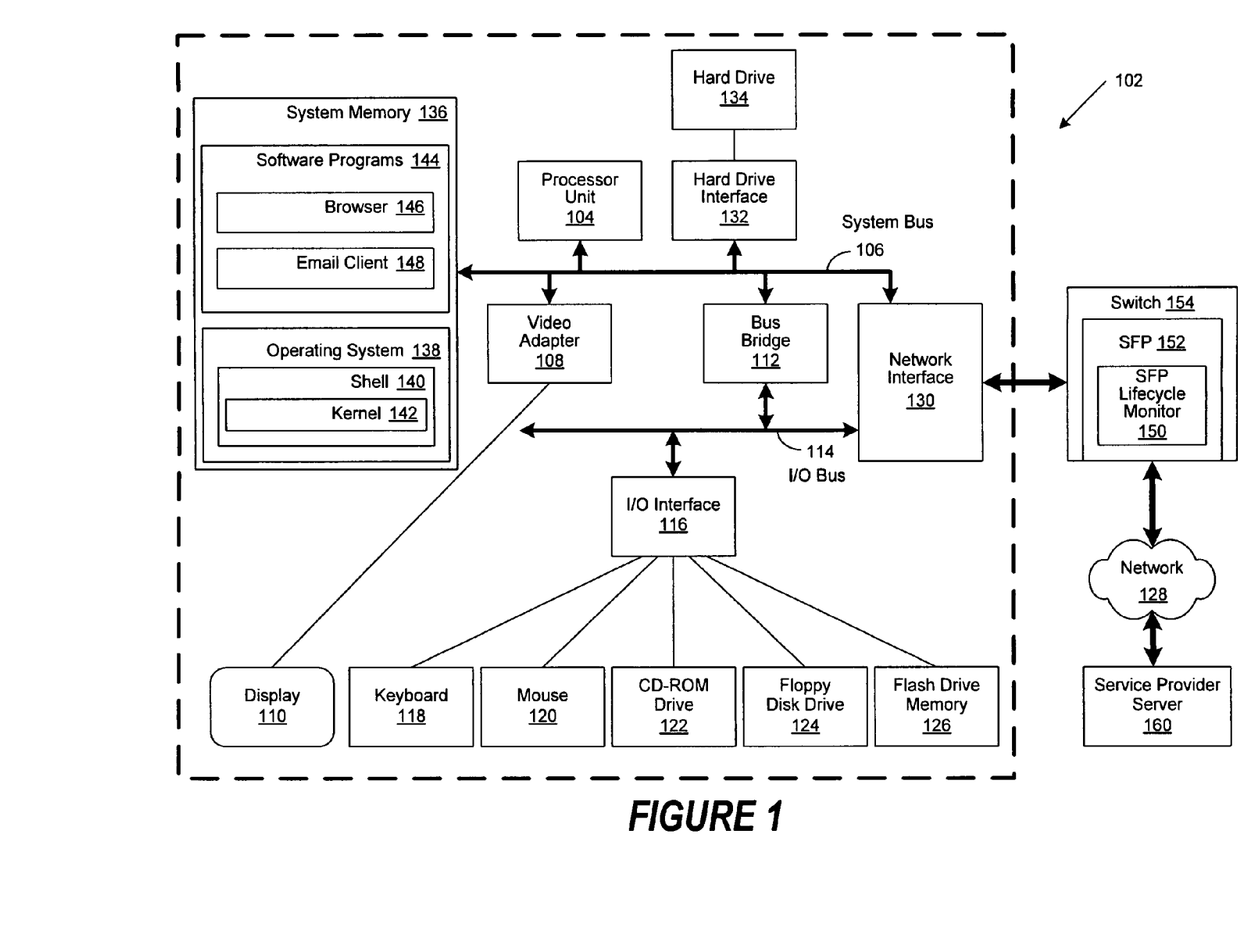
FIG. 1 depicts an exemplary client computer with which the present invention may be implemented.

FIG. 1 is a block diagram of an exemplary client computer 102 with which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk—Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 160 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 160.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 160. In various embodiments, the network interface 130 is operable to be coupled to switch 154, which comprises a Small Form-Factor Pluggable (SFP) module 152, further comprising an SFP Lifecycle Monitor 150. SFP Lifecycle Monitor 150 includes code for implementing the processes described in FIGS. 2-4 described hereinbelow.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
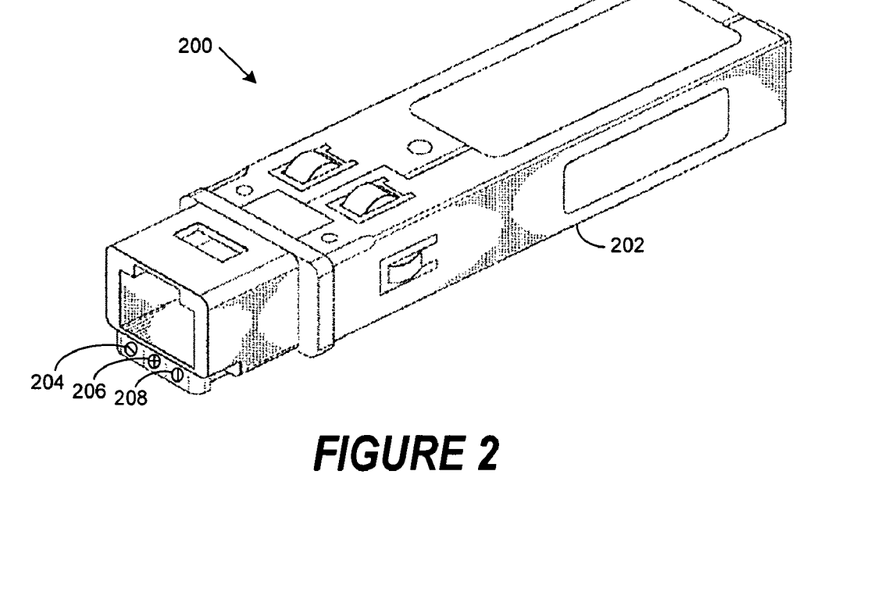
FIG. 2 is a simplified illustration of a Small Form-Factor Pluggable (SFP) optical transceiver as implemented in accordance with an embodiment of the invention to visually indicate its lifecycle state with light emitting diodes (LEDs)

FIG. 2 is a simplified illustration of a Small Form-Factor Pluggable (SFP) 200 optical transceiver as implemented in accordance with an embodiment of the invention to visually indicate its lifecycle state with light emitting diodes (LEDs). In various embodiments, the SFP 200 is compatible with the Small Form-factor Pluggable Transceiver MultiSource Agreement (SFP MSA). In these and other embodiments, SFP 200 comprises an SFP enclosure 202 further comprising light emitting diodes (LEDs) 204, 206, and 208. In one embodiment, the SFP 200 comprises logic operable to monitor the number of optical light pulse signals processed by the SFP 200 and generate a Total Number. As used herein, a Total Number is the number of all optical light pulse signals processed by the SFP 200 during its operational life. In another embodiment, the SFP comprises memory to store the Total Number.

In various embodiments, the SFP comprises logic operable to determine whether the Total Number exceeds a predetermined lifecycle number of optical light pulse signals. As used herein, a Lifecycle Number is a predetermined number of optical light pulse signals that can be processed by an SFP before the SFP enters a failed operating state. As an example, the Lifecycle Number may be determined by a combination of design specifications and empirical measurements. As another example, the Lifecycle Number may be determined using predictive analytics. Skilled practitioners of the art will appreciate that there are many known approaches to determining the lifecycle of a device and the foregoing are offered only as examples. If it is determined that the Total Number exceeds the Lifecycle Number, then the end-of-life state of the SFP 200 is visually indicated by illuminating a light emitting diode (LED) 208 comprising a color attribute (e.g., the color red) located on the SFP enclosure 202.

However, if it is determined that the Total Number does not exceed the Lifecycle Number then a determination is also made whether the Total Number exceeds a predetermined lifecycle margin threshold. As used herein, a lifecycle margin threshold is a percentage of the Lifecycle Number. As an example, the lifecycle margin threshold is set to 80% to indicate an additional margin of operating reliability for an SFP. If the Total Number is less than 80% of the Lifecycle Number, then the lifecycle margin threshold has not been exceeded. Conversely, if the Total Number is greater than 80% of the Lifecycle Number, then the lifecycle margin threshold has been exceeded, indicating that the SFP may be entering a less reliable stage of its lifecycle. In various embodiments, the SFP comprises logic operable to compare the Total Number to the Lifecycle Number and then perform calculations to determine whether or not the lifecycle margin threshold has been exceeded. If the lifecycle margin threshold has been exceeded, then the marginal lifecycle state of the SFP 200 is visually indicated by illuminating a light emitting diode (LED) 206 comprising a color attribute (e.g., the color yellow) located on the SFP enclosure 202.

However, if the lifecycle margin threshold has not been exceeded, then the non-marginal lifecycle state of the SFP 200 is visually indicated by illuminating a light emitting diode (LED) 204 comprising a color attribute (e.g., the color green) located on the SFP enclosure 202. As used herein, a non-marginal lifecycle state is defined as when the total number of optical light pulse signals processed by the SFP is less than the lifecycle margin threshold. In various embodiments, the SFP comprises logic operable to calculate the remaining life of the SFP by comparing the total number of optical light pulse signals processed by the SFP to its corresponding Lifecycle Number. It will be appreciated that the visual indication of the lifecycle state of SFP 200 allows a user to know when an SFP 200 is approaching the end of its lifecycle and replace it before it fails.

Figure 3:
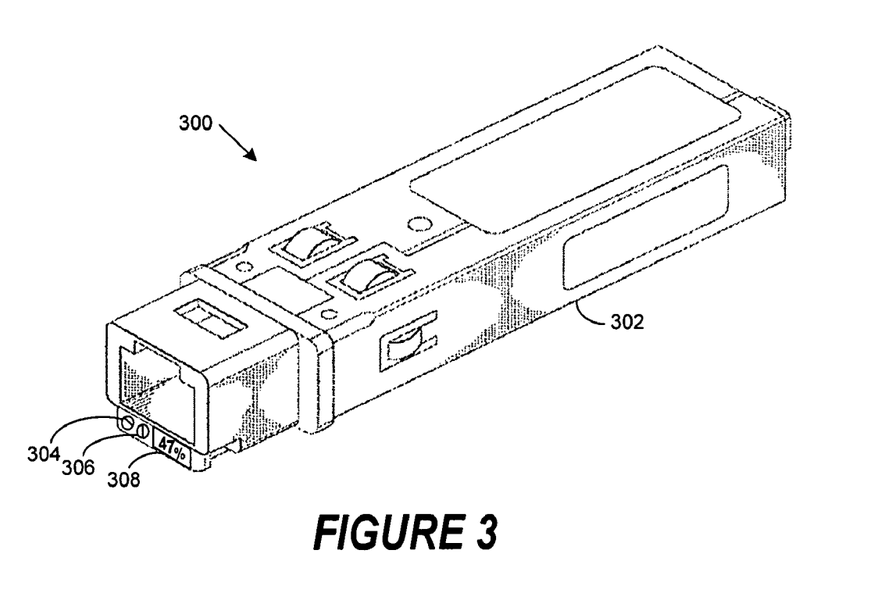
FIG. 3 is a simplified illustration of an SFP optical transceiver as implemented in accordance with an embodiment of the invention to visually indicate its lifecycle state with an alphanumeric display.

FIG. 3 is a simplified illustration of a Small Form-Factor Pluggable (SFP) 300 optical transceiver as implemented in accordance with an embodiment of the invention to visually indicate its lifecycle state with an alphanumeric display. In various embodiments, the SFP 300 is compatible with the Small Form-factor Pluggable Transceiver MultiSource Agreement (SFP MSA). In these and other embodiments, SFP 300 comprises an SFP enclosure 302, which further comprises light emitting diodes (LEDs) 304, 306, and alphanumeric display 308.

In various embodiments, the failed operating state of the SFP 300 is visually indicated by illuminating a light emitting diode (LED) 306 comprising a color attribute (e.g., the color red) located on the SFP enclosure 302. In another embodiment, the failed operating state of the SFP 300 is visually indicated by displaying a message (e.g., "ERROR", "FAILED", etc.) on an alphanumeric character display 308 located on the SFP enclosure 302. Conversely, a healthy operating state of the SFP 300 is visually indicated by illuminating a light emitting diode (LED) 304 comprising a color attribute (e.g., the color green) located on the SFP enclosure 302. In another embodiment, the healthy operating state of the SFP 300 is visually indicated by displaying a message (e.g., "HEALTHY", "ACTIVE", etc.) on an alphanumeric character display 308 located on the SFP enclosure 302.

In one embodiment, the SFP 300 comprises logic operable to monitor the number of optical light pulse signals processed by the SFP 200 and generate a Total Number as described in greater detail hereinabove. In another embodiment, the SFP comprises memory to store the Total Number. In various embodiments, the SFP 300 comprises logic operable to determine whether the Total Number, as described in greater detail hereinabove, exceeds a predetermined lifecycle number of optical light pulse signals. If it is determined that the Total Number exceeds the Lifecycle Number, then the end-of-life state of the SFP 300 is visually indicated by displaying a message (e.g., "ERROR", "FAILED", etc.) on the alphanumeric character display 308 located on the SFP enclosure 302.

However, if it is determined that the Total Number does not exceed the Lifecycle Number, then a determination is also made whether the Total Number exceeds a predetermined lifecycle margin threshold as described in greater detail hereinabove. In various embodiments, the SFP comprises logic operable to compare the Total Number to the Lifecycle Number and then perform calculations to determine whether or not the lifecycle margin threshold has been exceeded. If the lifecycle margin threshold has been exceeded, then the marginal lifecycle state of the SFP 200 is visually indicated by displaying a message (e.g., "Marginal", "Replace", etc.) on the alphanumeric character display 308 located on the SFP enclosure 302.

However, if the lifecycle margin threshold has not been exceeded, then the non-marginal lifecycle state of the SFP 200 is visually indicated by displaying a percentage (e.g., "47%", "22%", etc.) on an alphanumeric character display 308 located on the SFP enclosure 302. In this embodiment, the displayed percentage quantitatively indicates the remaining percentage of the Lifecycle Number of the SFP. In another embodiment, the displayed percentage quantitatively indicates the total number of optical light pulse signals processed by the SFP relative to its Lifecycle Number. It will be apparent to those of skill in the art that the implementation of many such visual indications are possible and the foregoing are presented only as examples and are not intended to limit the scope or spirit of the present invention. It will also be appreciated that the quantifiable visual indication of the lifecycle state of SFP 300 allows a user to know when an SFP 300 is approaching the end of its lifecycle and more accurately determine when it should be replaced.

Figure 4:
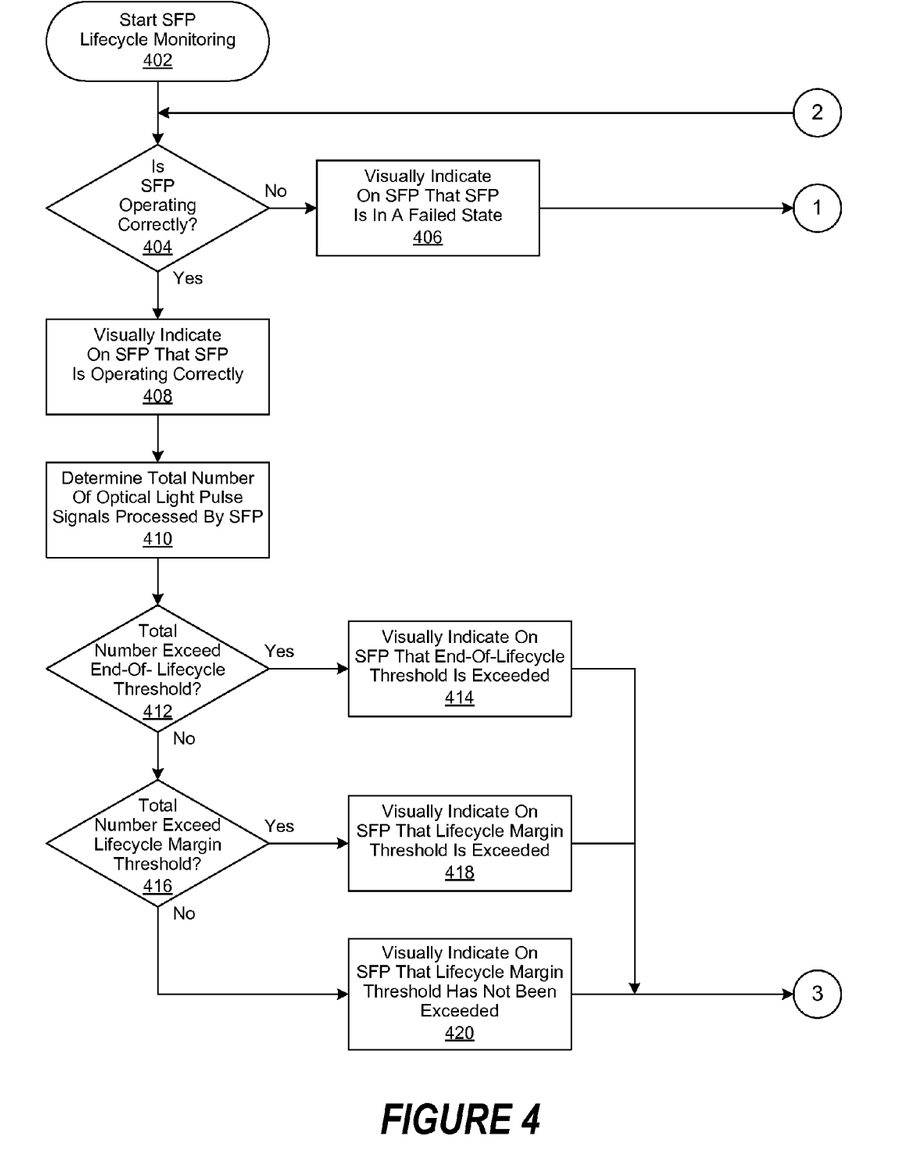
FIG. 4 is a generalized flow chart of an embodiment of the invention as implemented to visually indicate the lifecycle state of an optical transceiver.

FIG. 4 is a generalized flow chart of an embodiment of the invention as implemented to visually indicate the lifecycle state of an optical transceiver. In various embodiments, the optical transceiver module is compatible with the Small Form-factor Pluggable Transceiver MultiSource Agreement (SFP MSA). In this embodiment, SFP lifecycle monitoring operations begin in step 402, followed by making a determination in step 404 whether the SFP is operating correctly. If not, then a failed operating state is visually indicated on the SFP in step 406. In one embodiment, the failed operating state of the SFP is visually indicated by illuminating a light emitting diode (LED) comprising a color attribute (e.g., the color red) located on the SFP enclosure. In another embodiment, the failed operating state of the SFP is visually indicated by displaying a message (e.g., "ERROR", "FAILED", etc.) on an alphanumeric character display located on the SFP enclosure. A determination is then made in step 428 whether to continue SFP lifecycle monitoring. If not, then SFP lifecycle monitoring is ended in step 430. Otherwise, the process is continued, proceeding with step 404.

However, if it is determined in step 404 that the SFP is operating correctly, then a healthy operating state is visually indicated on the SFP in step 407. In one embodiment, the healthy operating state of the SFP is visually indicated by illuminating a light emitting diode (LED) comprising a color attribute (e.g., the color green) located on the SFP enclosure. In another embodiment, the healthy operating state of the SFP is visually indicated by displaying a message (e.g., "HEALTHY", "ACTIVE", etc.) on an alphanumeric character display located on the SFP enclosure.

The total number of optical light pulse signals processed by the SFP is then determined in step 410. In one embodiment, the SFP comprises logic operable to monitor the number of optical light pulse signals processed by the SFP and generate a Total Number. As used herein, a Total Number is the number of all optical light pulse signals processed by the SFP during its operational life. In another embodiment, the SFP comprises memory to store the Total Number. In step 412 a determination is made whether the Total Number exceeds a predetermined lifecycle number of optical light pulse signals. As used herein, a Lifecycle Number is a predetermined number of optical light pulse signals that can be processed by an SFP before the SFP enters a failed operating state.

If it is determined in step 412 that the Total Number exceeds the Lifecycle Number, then the SFP's end-of-life state is visually indicated on the SFP in step 414. In one embodiment, the end-of-life state of the SFP is visually indicated by illuminating a light emitting diode (LED) comprising a color attribute (e.g., the color red) located on the SFP enclosure. In another embodiment, the end-of-life state of the SFP is visually indicated by displaying a message (e.g., "End-Of-Life", "EOL", etc.) on an alphanumeric character display located on the SFP enclosure.

However, if it is determined in step 412 that the Total Number does not exceed the Lifecycle Number, then a determination is made in step 416 whether the Total Number exceeds a predetermined lifecycle margin threshold. As used herein, a lifecycle margin threshold is a percentage of the Lifecycle Number. As an example, the lifecycle margin threshold is set to 80% to indicate an additional margin of operating reliability for an SFP. If the Total Number is less than 80% of the Lifecycle Number, then the lifecycle margin threshold has not been exceeded. Conversely, if the Total Number is greater than 80% of the Lifecycle Number, then the lifecycle margin threshold has been exceeded, indicating that the SFP may be entering a less reliable stage of its lifecycle. In various embodiments, the SFP comprises logic operable to compare the Total Number to the Lifecycle Number and then perform calculations to determine whether or not the lifecycle margin threshold has been exceeded.

If it is determined in step 416 that the lifecycle margin threshold has been exceeded, then the marginal lifecycle state of the SFP is visually indicated on the SFP enclosure in step 418. In one embodiment, the marginal lifecycle state of the SFP is visually indicated by illuminating a light emitting diode (LED) comprising a color attribute (e.g., the color yellow) located on the SFP enclosure. In another embodiment, the marginal lifecycle state of the SFP is visually indicated by displaying a message (e.g., "Marginal", "Replace", etc.) on an alphanumeric character display located on the SFP enclosure.

However, if it is determined in step 416 that the lifecycle margin threshold has not been exceeded, then the SFP's non-marginal lifecycle state is visually indicated on the SFP enclosure in step 420. As used herein, a non-marginal lifecycle state is defined as when the total number of optical light pulse signals processed by the SFP is less than the lifecycle margin threshold. In various embodiments, the SFP comprises logic operable to calculate the remaining life of the SFP by comparing the total number of optical light pulse signals processed by the SFP to its corresponding Lifecycle Number. In one embodiment, the SFP's non-marginal lifecycle state is visually indicated by illuminating a light emitting diode (LED) comprising a color attribute (e.g., the color green) located on the SFP enclosure. In another embodiment, the non-marginal lifecycle state of the SFP is visually indicated by displaying a percentage (e.g., "47%", "22%", etc.) on an alphanumeric character display located on the SFP enclosure. In this embodiment, the displayed percentage quantitatively indicates the remaining percentage of the Lifecycle Number of the SFP. In another embodiment, the displayed percentage quantitatively indicates the total number of optical light pulse signals processed by the SFP relative to its Lifecycle Number.

Once the lifecycle state of the SFP is respectively indicated on the enclosure of the SFP in steps 414, 418, or 420, optical light pulse signals processed by the SFP are detected in step 422. A determination is then made in step 424 whether an optical light pulse signal is detected. If so, the Total Number for the SFP is incremented by one. Otherwise, or once the Total Number has been incremented by one, a determination is made in step 428 whether to continue SFP lifecycle monitoring. If not, then SFP lifecycle monitoring is ended in step 430. Otherwise, the process is continued, proceeding with step 404.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implementable method for visually indicating the remaining life of an optical transceiver module, comprising:
    using processing logic configured to
        monitor the number of optical light pulse signals processed by an optical transceiver module, wherein said monitoring generates a total number of processed optical light pulse signals;
        compare said total number to a predetermined lifecycle number of optical light pulse signals;
        calculate the remaining life of the optical transceiver module from said comparison; and
    indicating the remaining life, wherein the remaining life is visually indicated on said optical transceiver module.

2. The method of claim 1, wherein the optical transceiver module is compatible with the Small Form-factor Pluggable Transceiver MultiSource Agreement (SFP MSA).

3. The method of claim 1, wherein:
    said optical transceiver module comprises a plurality of light emitting diodes (LEDs); and
    each of said plurality of LEDs corresponds to a lifecycle threshold.

4. The method of claim 3, wherein each of said LEDs comprises a color attribute associated with a said corresponding lifecycle threshold.

5. The method of claim 1, wherein said optical transceiver module comprises a numeric display operable to provide said indication of remaining life.

6. A system comprising:
a processor;
a data bus coupled to the processor; and
a computer-usable medium embodying computer program code, the computer-usable medium being coupled to the data bus, the computer program code visually indicating the remaining life of an optical transceiver module and comprising instructions executable by the processor and configured for:
    using processing logic configured to
        monitor the number of optical light pulse signals processed by an optical transceiver module, wherein said monitoring generates a total number of processed optical light pulse signals;
        compare said total number to a predetermined lifecycle number of optical light pulse signals;
        calculate the remaining life of the optical transceiver module from said comparison; and
    indicating the remaining life, wherein the remaining life is visually indicated on said optical transceiver module.

7. The system of claim 6, wherein the optical transceiver module is compatible with the Small Form-factor Pluggable Transceiver MultiSource Agreement (SFP MSA).

8. The system of claim 6, wherein:
    said optical transceiver module comprises a plurality of light emitting diodes (LEDs); and
    each of said plurality of LEDs corresponds to a lifecycle threshold.

9. The system of claim 8, wherein each of said LEDs comprise a color attribute associated with a said corresponding lifecycle threshold.

10. The system of claim 6, wherein said optical transceiver module comprises a numeric display operable to provide said indication of remaining life.

11. A non-transitory computer readable medium embodying computer program code, the computer program code comprising computer executable instructions configured for:
    using processing logic configured to
        monitor the number of optical light pulse signals processed by an optical transceiver module, wherein said monitoring generates a total number of processed optical light pulse signals;
        compare said total number to a predetermined lifecycle number of optical light pulse signals;
        calculate the remaining life of the optical transceiver module from said comparison; and
    indicating the remaining life, wherein the remaining life is visually indicated on said optical transceiver module.

12. The non-transitory computer readable medium of claim 11, wherein the optical transceiver module is compatible with the Small Form-factor Pluggable Transceiver MultiSource Agreement (SFP MSA).

13. The non-transitory computer readable medium of claim 11, wherein:
    said optical transceiver module comprises a plurality of light emitting diodes (LEDs); and
    each of said plurality of LEDs corresponds to a lifecycle threshold.

14. The non-transitory computer usable readable medium of claim 13, wherein each of said LEDs comprise a color attribute associated with a said corresponding lifecycle threshold.

15. The non-transitory computer readable medium of claim 11, wherein said optical transceiver module comprises a numeric display operable to provide said indication of remaining life.

16. The non-transitory computer readable medium of claim 11, wherein the computer executable instructions are deployable to a client computer from a server at a remote location.

17. The non-transitory computer readable medium of claim 11, wherein the computer executable instructions are provided by a service provider to a customer on an on-demand basis.

* * * * *